United States Patent [19]
Puozzo et al.

[11] Patent Number: 4,808,791
[45] Date of Patent: Feb. 28, 1989

[54] METHOD FOR PROCESSING LARGE CAST IRON DIES, PARTICULARLY FOR VEHICLE SHEET-METAL PRESSING, AND THE APPARATUS FOR ITS IMPLEMENTATION

[75] Inventors: Luciano Puozzo; Guido Contrafatto; Paolo Gay, all of Turin, Italy

[73] Assignee: Fiat Auto S.p.A., Turin, Italy

[21] Appl. No.: 135,307

[22] Filed: Dec. 21, 1987

[30] Foreign Application Priority Data

Dec. 19, 1986 [IT] Italy .................. 67947 A/86

[51] Int. Cl.$^4$ ............................................. B23K 26/08
[52] U.S. Cl. ........................... 219/121.78; 148/903; 219/121.85
[58] Field of Search ................. 219/121 LU, 121 LV, 219/121 L, 121 LM, 121 LE, 121 LF; 148/145, 146, 903

[56] References Cited

U.S. PATENT DOCUMENTS

| | | | |
|---|---|---|---|
| 3,619,550 | 11/1971 | Matthews | 219/121 L |
| 4,093,842 | 6/1978 | Scott | 148/145 |

FOREIGN PATENT DOCUMENTS

| | | |
|---|---|---|
| 0187934 | 7/1986 | European Pat. Off. |
| 3543897 | 7/1986 | Fed. Rep. of Germany |
| 58-185721 | 10/1983 | Japan |
| 60-213390 | 10/1985 | Japan |
| 0258407 | 12/1985 | Japan ................... 148/903 |
| 0238396 | 8/1986 | Japan ................... 148/903 |
| 0084519 | 12/1986 | Japan ................... 148/903 |
| 2120202A | 11/1983 | United Kingdom |

OTHER PUBLICATIONS

Edward V. Locke et al, Metal Processing with a High--Phosphorus $CO_2$ Laser, IEE Journal of Quantum Electronics, Feb. 1974, vol. QE-10, pp. 179–185.

Zaiguang Li et al, Laser Surface Treatment of High--Phosphorus Cast Iron, Journal of Applied Physics, vol. 58, Nov. 15, 1985, pp. 3860–3864.

Primary Examiner—C. L. Albritton
Attorney, Agent, or Firm—Shlesinger Arkwright & Garvey

[57] ABSTRACT

A method for processing large cast iron dies for use in pressing the sheet-metal components of vehicle bodies is described; this method results in improved pressing performance, such as extended life and, in particular, drastic reduction in rejects and down-times due to seizure; its main characteristic consists of subjecting those die regions most subject to operational wear to localized heating by a laser beam which strikes normal to the surface so as to harden the treated regions without the risk of cracking; the treatment is implemented by a focusing head controlled by a robot having five capabilities of movement.

3 Claims, 1 Drawing Sheet

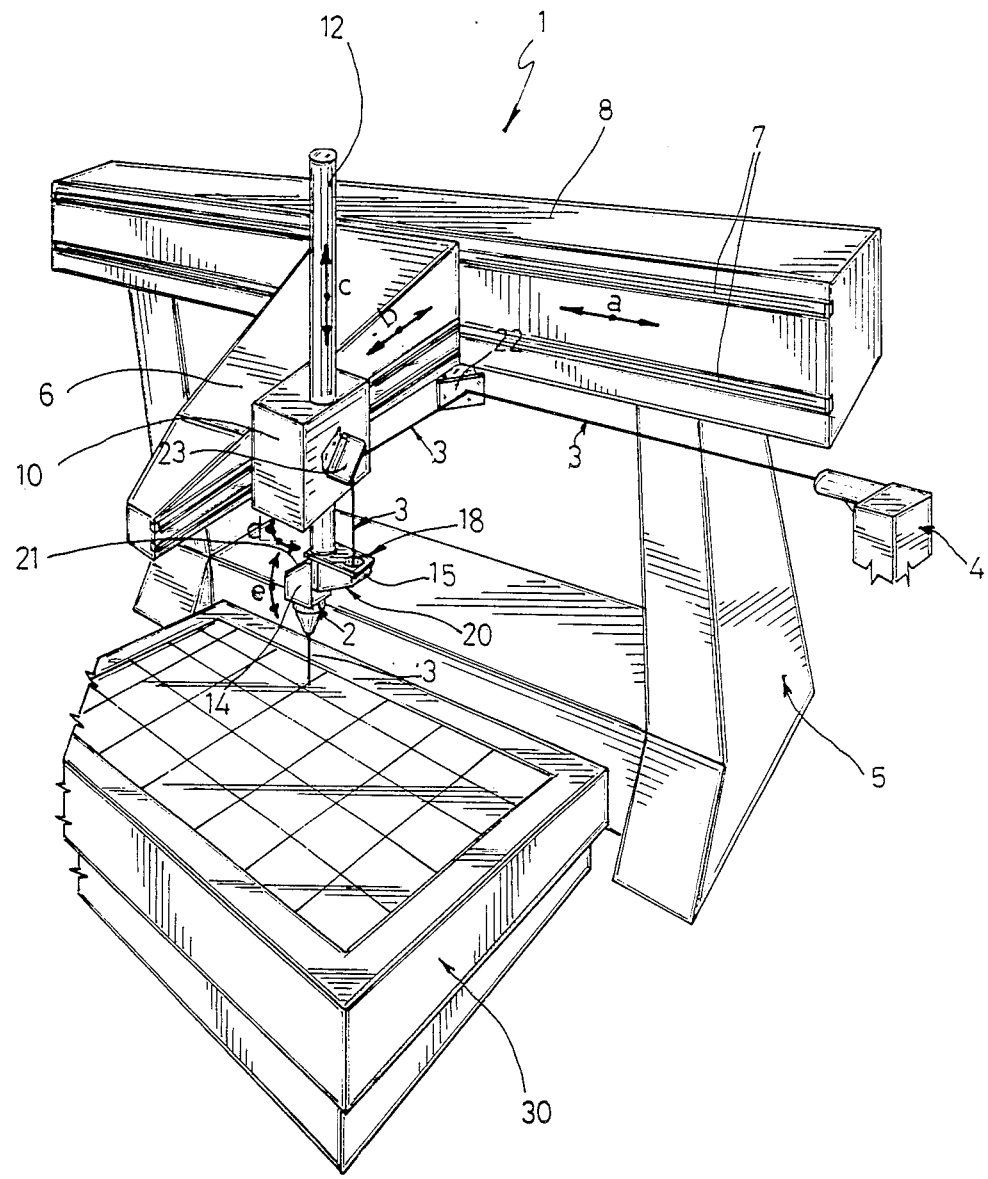

METHOD FOR PROCESSING LARGE CAST IRON DIES, PARTICULARLY FOR VEHICLE SHEET-METAL PRESSING, AND THE APPARATUS FOR ITS IMPLEMENTATION

BACKGROUND OF THE INVENTION

This invention relates to a method for processing large cast iron dies, particularly of the type used in the automobile industry for pressing sheet metal to form vehicle body parts. Such dies are usually constructed at the present time of alloy cast iron, which after casting is mechanically machined, this being followed in most cases by surface hardening of those regions of the die which are subjected to maximum wear when in use. Specifically, the purpose of the surface hardening is to harden these die regions in order to increase their wear resistance, which is known to depend on the surface hardness, so increasing the life of the entire die and obviating the need to take costly action to restore its initial geometry, with consequent production loss. However, flame hardening has numerous drawbacks: it is of slow implementtion and cannot be automated due to the fact that because of its nature it cannot be easily parameterized, and therefore has to be executed manually by specialised operators; moreover, whatever the ability of these latter it does not produce uniform results in terms of hardness and depth of hardening, and can give rise to cracks in the die with consequent need for repair; on the other hand, the replacement of flame hardening by other analogous surface hardening treatments such as induction or by treatment with a laser beam has not so far been possible, as the complicated shapes of the dies inevitably result in superimposing of more than one hardening treatment in certain regions of the die, with the consequent formation of cracks. Finally, known flame-hardened dies have the drawback of being subject to seizure when in use, this being the cause of many pressing rejects and the need for considerable lubrication, and in addition results in frequent and costly down-times of the presses equipped with such dies.

SUMMARY OF THE INVENTION

An object of the invention is to provide a method for processing large cast iron dies, in particular those used for vehicle sheet-metal pressing, which obviates the need for flame-hardening while ensuring an acceptable die life; a further object is to provide dies which when in use are able to reduce lubricant consumption and/or reduce or eliminate rejects and machine down-times due to seizure.

Said objects are attained according to the invention by a method for processing large cast iron dies, particularly for sheet-metal pressing for vehicle construction, characterised in that in those die regions which are most subject to wear in relation to the specific use of the die, this latter is subjected to localised heating beyond the austenization temperature by the application of a laser beam which is transferred along said regions by moving it in such a manner that it always remains orthogonal to the surface of said regions so as to rigorously follow their profile; said heating being effected by means of a laser beam focusing head having five capabilities of movement and with such parameters as to produce in correspondence with said die regions a localised martensitic transformation to a depth of at least 1 mm and a surface hardness exceeding 400 HB. In practice, the applicant has surprisingly found that by operating in a suitable manner it is possible to apply laser treatment of such an intensity as to produce known surface hardening in cast iron for automobile use in place of the costly, slow and unsatisfactory flame-hardening, without the occurrence, which common opinion has up to the present time considered inevitable, of cracks in those die regions in which more than one successive hardening treatment has been superimposed because of the die geometry. By virtue of this advantageous method of operation, which consists substantially of moving the laser beam focusing head, by which the treatment is carried out, in such a manner that the laser beam always strikes the region to be treated rigorously perpendicular to the surface thereof, ie such that the focusing head movements rigorously follow the profile of the region to be treated however this profile may be, a uniform and considerable increase in the surface hardness of the die is obtained precisely in those regions subject to most wear, with a consequent longer die life than known dies, together with a lower cost and increased speed of treatment. Moreover, as laser hardening is an operation which can be parameterized, it is possible to automate the hardening operation, provided it is carried out by robots able to move the fousing head in the required manner at a rigorously constant distance from the treated surfaces, while at the same time enabling the focusing head to continuously receive the laser beam from the emission source which, in the current state of the art, is known to be of such dimensions and weight for high power emission as to prevent it from undergoing any movement, and is thereore fixed. However the most surprising result of the method of operation according to the invention, and which was completely unexpected and unforseeable, consists of the fact that those cast iron dies which have undergone laser treatment in which the beam strikes precisely orthogonally those die regions in which wear is mostly localised during use, have shown an operational behaviour which is decidedly superior and surprising, with the almost total disappearance of seizure during the sheet-metal working, which drastically reduces machine down-times during use. This unexpected behaviour of dies constructed in accordance with the method of the invention is usually also accompanied by a drastic reduction in the need for die lubrication during the sheet-metal pressing, and this is even more apparent if during the die construction, particular methods of applying the laser beam are combined with particular types of cast iron. In particular, various types of cast iron of lamellar structure have been widely tested, such as G190, G210 and Gh P (in accordance with Italian Standards denominations), very positive results having been obtained without the appearance of cracks and without melting the metal, and with hardness increases which exceed even twice the initial hardness. By extrapolating the results obtained, it would be logical to suppose that the same positive results would also be obtainable operating with cast irons of different type, such as pearlite or Meehanite, which are known to be better hardenable than those tested and for which even better results would therefore be expected. The laser hardening of such cast irons is implemented according to the invention by a machine numerically controlled along five axes and provided with said focusing head, a laser source and a suitable reflecting mirror system, as will be described hereinafter; the mirrors are of copper construction and are cooled internally by water circulation, and the incident laser beam is made to move over the surface of the region to be treated at constant speed (of the order of 0.3–0.5 m/min) along rectilinear or curved trajectories and in a single predetermined direction along each trajectory, its angle of incidence to the surface of the treated region being always normal to said surface; the laser source used is preferably of the carbon dioxide type and consists of a commercial laser cavity of about 5 kW power, with vacuum gas circulation and arc excitation; preferably, a laser cavity of the "Spectra Physics Model 975" (registered trademark) is used, capable of generating a laser beam of 10.6 micrometers (microns) wavelength, of 44 mm diameter and having a maximum divergence of about 3 milliradians. Of the dies according to the invention, which are of conventional construction by casting followed by possible mechanical machining, those parts which are most suitable for laser hardening treatment, and at the same time giving the best overall results in terms of greater overall die efficiency, are the blank holder rings, which are usually the components which most suffer the effects of wear during sheet-metal pressing. After heating to beyond the austenization temperature by the laser beam, quenching is effected according to the invention in air or by free cooling to ambient temperature after heating. Because of the extreme localisation of laser heating there is substantially no heat dispersion during the heating stage, so that as soon as the laser beam ceases to strike the treated surface, either because of its withdrawal therefrom or because of beam suppression, the region lying immediately below this surface is cooled more or less instantaneously by conduction, the heat accumulated therein being dispersed into the cold mass of the treated component from which it is then transferred into the environment by convection. It is therefore not necessary to use water cooling, and in fact extremely drastic quenching is obtained with a cooling rate much greater than the rate obtainable even by the most drastic water quenching, all without the minimum risk of cracking, even in materials such as cast irons of lamellar structure which whenusing other treatment (such as flame-hardening) are particularly difficult to treat without damage. Finally, in order to obtain the described surprising results during the use of dies constructed in accordance with the invention, it has been found absolutely necessary to conduct the hardening treatment by operating the laser in such a manner as to obtain in the treated regions a localised martensitic transformation to a depth of at least 1 mm and a surface hardness exceeding 400 HB (Brinell number). These parameters are critical, and on the basis of these any expert of the art is able to calculate, using the known mathematical and empirical correlations, those physical and electrical parameters which need to be set for any type of laser of known power. If nodular cast iron is used for the construction of the die or of those regions thereof to be laser-treated, the cast iron is surface-metallized after hardening, preferably with chromium.

BRIEF DESCRIPTION OF THE DRAWING

The present invention is described hereinafter in terms of a non-limiting emodiment with reference to the accompanying drawing, which shows the machine necessary for implementing the method of the invention, and with reference to the subsequent experimental examples.

DETAILED DESCRIPTION OF THE INVENTION

In the said accompanying drawing, the reference numeral 1 indicates overall a numerically controlled machine or robot provided with a focusing head 2 for a laser beam 3 produced by a fixed source 4 consisting of any power laser cavity of any known type, not shown in detail for simplicity. The machine 1, which according to the invention is able to set the head 2 with precision at any point in space by offering it five capabilities of movement along five numerically controlled "axes", identified by the arrows and by the letters a, b, c, d and e, comprises a portal structure 5, an arm 6 carried by the structure 4 and projecting perpendicularly therefrom and mobile along a first "axis" or controlled direction a on respective guides 7 carried by an upper cross-member 8 of the structure 5, a carriage 10 carried laterally by and projecting from the arm 5 and mobile thereon on guides 11 along a second "axis" or controlled direction b perpendicular to the axis a, and a shaft or column 12 carried by the carriage 10 and mobile through this latter on suitable mechanisms of any known type, not shown for simplicity, for example of the screw/nut type, along its own axis so as to translate along a third "axis" or controlled direction c perpendicular to both the axes a and b. The head 2, of known type and not described in detail for simplicity, is carried angularly rigid by a turret 14 which is mounted rotatable about an axis parallel to the cross-member 8 and is therefore mobile along a fourth "axis" or controlled direction e, in the direction of the arrows. The turret 14 is carried offset from the axis of the shaft 12 in a cantilever manner by a connection piece 15, which is carried angularly rigid by the shaft 12, which besides being able to slide along the direction or axis c is also rotatable about is own axis of symmetry so as to be able to move the connection piece 15 and the turret 14 rigid therewith along a fifth "axis" or controlled direction d.

The connection piece at is disposed eccentric to the axis of the shaft 12 and cantilevered on the opposite side to the turret (14), and is provided with an aperture 18 through which the beam 3 can enter the connection piece 15 and, by means of a pair of mirrors, not shown but of known type, carried internally by respective oblique faces 20 and 21 of the connection piece 15 and of the turret 14 respectively, be reflected in known manner through these to reach the head 2. The mirrors carried by the walls 20 and 21 are coaxial with the axis of rotation of the turret 14, and a pair of respective mirrors 22 and 23 constructed of copper in known manner and cooled internally by a water flow deviates the beam 3 from the source 4 to the aperture 18. In particular, according to the invention, the mirror 22 is carried rigidly by the arm 6 in proximity to the cross-member 8, whereas the mirror 23 projects from the side of the carriage 10. Both the mirrors 22, 23 are disposed obliquely at 45°. Finally, the machine 1 is completed by a support table 30 slidable on rails, not shown for simplicity, and on which the dies to be treated (or a part thereof) can be referenced and fixed, and by suitable known electronic control and reference devices, not shown for simplicity, for example consisting of an encoder for each "axis" or controlled direction, a suitable microprocessor unit, and suitable electric motors, preferably of the stepping type, arranged to move the arm 6, the carriage 10, the shaft 12 and the turret 14 in the rectilinear or curved directions a, b, c, d and e in a controlled manner.

EXAMPLE I

Using cast irons of different compositions, all of which fall within those listed in Table I, two test-pieces are prepared for each different type of cast iron. All the test-pieces are rectilinear, having dimensions of 40×100×100 mm, and a sectional shape identical to that of the blank holder rings of automobile dies, and are hardened by laser treatment followed by cooling in atmospheric air. A $CO_2$ laser source is used consisting of a 5 kW "Spectra Physics Model 975" (registered trademark) laser cavity fed with 30 amperes at 3000 volts and kept at 1 Torr, it being coupled to the machine or robot 1 heretofore described. Some test-pieces are treated with said laser source operating with known equipment, ie by directing the beam onto the regions to be treated using rotary mirrors without taking care to obtain a perpendicular strike, whereas others are treated using the machine 1 in the following manner: after positioning the head 2 over the required region by moving the arm 6 and carriage 10, the beam 3 is orientated perfectly perpendicular to the surface of the region to be treated, by modifying its attitude as the curvature of this region varies so as to rigorously follow its profile. This result is obtained, without the need to suppress the beam 3 during movement and without the need for auxiliary mirrors, by rotating the turret 14 and rotating the shaft 12, and simultaneously compensating the misalignment which is created following the rotation of the shaft 12 between the mirror 23 and aperture 18 by suitably moving the carriage 10 and the arm 6 from their initial position and simultaneously compensating any variations in height of the head 2 above the surface to be treated by vertically moving the shaft 12. It is apparent that any attempt without the aid of the machine 1 to keep the beam 3 perpendicular to the surface to be treated along its entire profile, if this is complicated, would result in loss of collimation of the beam 3 because of the inevitable relative movements between the deviating mirrors. The results obtained are given in Table II.

TABLE I

| Type of cast iron | Chemical composition | | | | | | |
|---|---|---|---|---|---|---|---|
| | C | Si | Mn | Ni | Cr | P | S |
| G190 | 3.0 3.1 | 1.9 2.0 | 0.6 0.7 | — | — | <0.15 | <0.12 |
| Gh P | 3 | 1.65 | 0.8 1 | — | 0.25 0.40 | 0.8 1 | <0.12 |
| G210 | 2.6 3.5 | 1.25 2.25 | 0.6 1 | 2.25 2.50 | 0.75 1 | <0.15 | <0.12 |

TABLE II

| Test-piece No. | cast iron | air quench | beam perpend. | cracks | thickness mm | hardness (HB) |
|---|---|---|---|---|---|---|
| 1 | 190 | yes | no | yes | 0.85 | 399 |
| 2 | " | yes | yes | no | 1.19 | 409 |
| 3 | 210 | yes | no | yes | 0.79 | 430 |
| 4 | " | yes | yes | no | 1.24 | 450 |
| 5 | Gh | yes | no | yes | 0.92 | 408 |
| 6 | " | yes | yes | no | 1.11 | 430 |

EXAMPLE II

Operating as in Example I and using the described apparatus 1, standard dies are prepared for producing the rear wheelhouse of an automobile, its blank holder rings being constructed of G190 cast iron having a composition as indicated in Table I. These dies are then used for sheet-metal pressing together with other similar dies of conventional construction, ie having manually flame-hardened blank holder rings of G210 cast iron construction. The operating results are given in Table III.

TABLE III

| Type of cast iron | No. of pieces produced | % to be scrapped | % to be repaired | Stoppages due to seizure |
|---|---|---|---|---|
| 210 flame-hardened | 10,000 | 0.32 | 1.35 | 50 |
| 190 laser-hardened | 10,000 | 0.05 | 0.64 | 2 |

EXAMPLE III

Operating as in Example II, standard dies are prepared for producing an automobile side member, its blank holder rings being constructed of Gh P cast iron having a composition as indicated in Table I, and quenched in air. These dies are then used for sheet-metal pressing together with other similar dies of conventional construction, ie having manually flame-hardened blank holder rings of G210 cast iron construction. The operating results are given in Table IV.

TABLE IV

| Type of cast iron | No. of pieces produced | % to be scrapped | % to be repaired | Stoppages due to seizure |
|---|---|---|---|---|
| 210 flame-hardened | 10,000 | 0.95 | 1.30 | 40 |
| Gh P laser-hardened | 10,000 | 0.21 | 0.6 | 1 |

EXAMPLE IV

Operating as in Example II, standard dies are prepared for producing the lower body side of an automobile, its blank holder rings being constructed of G210 NiCr alloy cast iron having a composition as indicated in Table I and quenched in air. These dies are then used for sheet-metal pressing together with other similar dies of conventional construction, ie having manually flame-hardened blank holder rings of G210 cast iron construction. The operating results are given in Table V.

TABLE V

| Type of cast iron | No. of pieces produced | % to be scrapped | % to be repaired | Stoppages due to seizure |
|---|---|---|---|---|
| 210 flame-hardened | 2,500 | 3.65 | 2.89 | 9 |
| 210 laser-hardened | 10,000 | 1.60 | 1.20 | 3 |

We claim:

1. A method for processing large cast iron dies, particularly for sheet metal pressing for vehicle construction, characterised in that in those die regions which are most subject to wear in relation to the specific use of the die, this latter is subjected to localised heating beyond the austenization temperature by the application of a laser beam which is transferred along said region by moving it in such a manner that it always remains orthogonal to the surface of said regions so as to rigorously follow their profile; said heating being effected by means of a laser beam focusing head having five capabilities of movement and with such parameters as to produce in correspondence with said die regions a localised martensitic transformation to a depth of at least 1 mm and a surface hardness exceeding 400 HB.

2. A method as claimed in claim 1, characterised in that those regions of said die to be subjected to said heating by laser beam are constructed of a special cast iron chosen from the group consisting of G210, G190 and Gh P, said heating by laser beam being followed by cooling in atmospheric air.

3. A method as claimed in claim 1, characterised in that said laser heating is effected by a carbon dioxide laser source, using a laser beam having a wavelength of 10.6 micrometers, a diameter of 44 mm, a maximum divergence of about 3 milliradians and a maximum power of about 5 kW, and which is orientated and focused towards said head by copper mirrors cooled by water circulation.

* * * * *